March 27, 1951  E. M. JACK  2,546,341
CLAMPING DEVICE FOR FISHING REELS
Filed Dec. 19, 1947
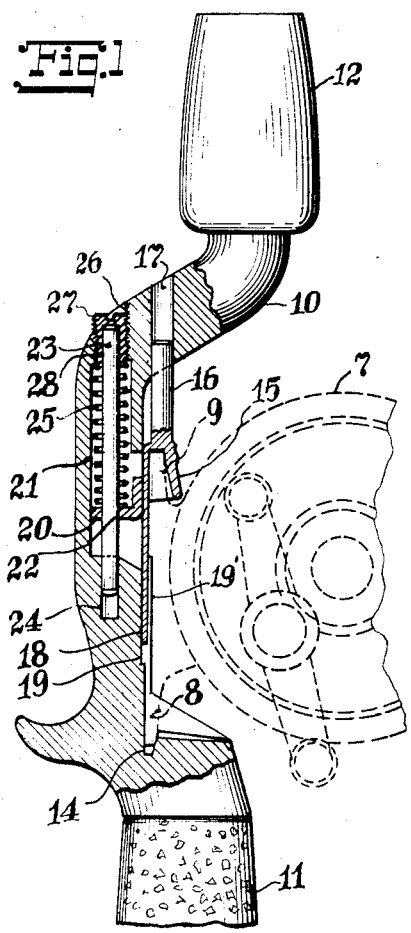
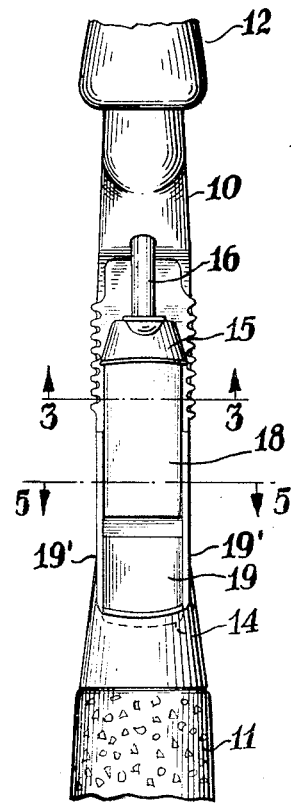
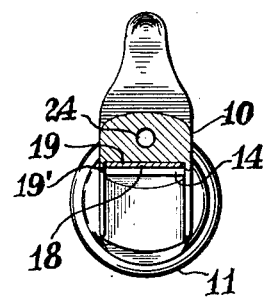
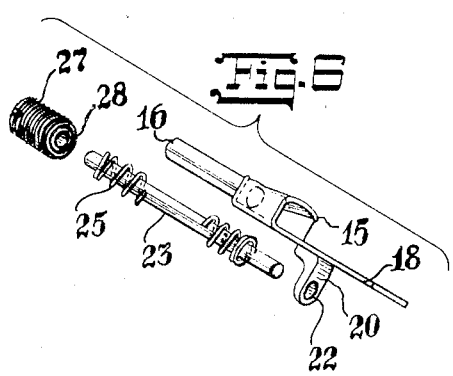
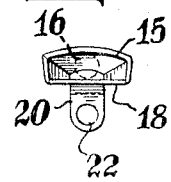
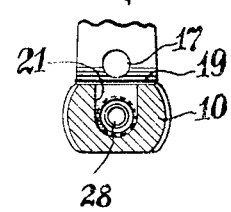
INVENTOR.
Edward M. Jack
BY
ATTORNEY Patented Mar. 27, 1951

2,546,341

UNITED STATES PATENT OFFICE 2,546,341

CLAMPING DEVICE FOR FISHING REELS

Edward Morris Jack, Litchfield, Conn., assignor to Union Hardware Company, Torrington, Conn., a corporation of Connecticut Application December 19, 1947, Serial No. 792,648

2 Claims. (Cl. 43—22)

This invention relates to what are frequently called reel seats for securing line reels to fish rods.

The main object is to provide a simple but reliable clamping device for a fish rod handle to which a reel may be quickly and easily secured.

Another object is to provide a device which can be readily adjusted to reel plates of different lengths and which can be readily adjusted to apply more or less pressure to the reel plate.

Accordingly the handle is provided with a spring pressed sliding clamp for engaging one end of the reel plate. This clamp is guided on the handle of the fish rod and the pressure of the spring can be readily adjusted.

Fig. 1 is a longitudinal sectional view and side elevation showing the preferred form of my invention, and showing a line reel in dotted lines.

Fig. 2 is a front view of the same without the reel.

Fig. 3 is a cross-sectional view of a fragment of the handle on the plane of the line 3—3 of Fig. 2, looking upwardly, the clamping parts being omitted.

Fig. 4 is an end view of the clamping slide.

Fig. 5 is a cross-sectional view on the plane of the line 5—5 of Fig. 2 looking downwardly.

Fig. 6 is an exploded perspective view showing the parts of the clamping device.

A part of a conventional reel 7 is shown in dotted lines in Fig. 1 and has the ends 8 and 9 of the usual base plate. The supporting part 10 of the handle is preferably metal and may be offset from the line of the grip 11 and the rod holder 12. This part 10 of the handle has a recess 14 to receive one end 8 of the reel plate. The clamping device has a socket 15 for holding the other end 9 of the reel plate. This socket 15 is secured to the guide rod 16 which slides in the passage 17 in the handle. The plate 18 extends from the socket and is guided to slide on the surface 19 of the handle between the flanges 19', 19'.

To the back of plate 18 is secured a lug 20 adapted to slide in a groove 21 in the front of the handle. This lug has a hole 22 for the rod 23 which is guided at its inner end in the recess 24 in the handle. A spring 25 surrounds rod 23 and is inserted into an opening 26 which leads to the groove 21. The outer end of the opening 26 is screw-threaded to receive a screw 27 which has a recess 28 to receive and guide the outer end of rod 23.

The spring 25 is compressed between the screw 27 and the lug 20. By adjusting the screw 27, the pressure of the spring 25 against the lug 20 can be adjusted so as to furnish greater or less pressure on the clamping slide as the operator may desire.

It will be seen that the outerward strain of the reel is taken up at the inner end by the integral wall of the recess 14 and at the outer end by the engagement of the rod 16 in the passage 17 as well as by the rod 23 which passes through the lug 20 at the back of the plate 18. Side play of the socket is prevented by the rod 16 in passage 17 and by the plate 18 between the flanges 19', 19'.

It will be seen that the reel may be quickly applied and locked in position on the handle by simply inserting the end 9 of the base plate in the socket portion 15 of the slide and moving said portion away from the grip 11 until the other end 8 of the reel plate is in position to be forced into the recess 14 by spring 25.

The parts all being simple and formed of metal can be made cheaply and according to standard patterns. At the same time the construction is very light and yet strong. By adjusting the screw 27 the pressure of the socket 15 against the reel plate may be varied to suit the user.

I claim:

1. In a fish rod handle, a metallic member serving as a reel support and having a body with a groove, and an upper surface with an opening communicating with the groove, an offset portion at one end of the body having a passage and an opening leading to said groove, an offset portion at the other end of said body having a recess, a slidable member having a portion forming a socket open at one end, a guide rod protruding from one end of said socket portion and slidable in said passage, a plate protruding from the open end of said socket portion and slidable on said surface, a perforated lug depending from said plate through the opening in the upper surface and into the groove, a screw for closing the outer end of said opening, a rod mounted in said opening and extending through the perforation in said lug for guiding the movement of the slidable socket, one end of said rod being connected to said screw, and a coil spring surrounding said rod and having one end pressing against said lug and having its other end seated against the screw, whereby said spring is compressed and pressure exerted upon the lug for moving the movable socket.

2. In a fish rod handle, a metallic member serving as a reel support and having a body with a longitudinal groove, and an upper surface with an opening communicating with the groove, an offset portion at one end of the body having a longitudinal passage and a longitudinal screw threaded opening leading to said groove, an offset portion at the other end of said body having a recess for receiving one end of a reel seat, a slidable member having a portion forming a reel seat socket open at one end, a guide rod protruding from one end of said socket portion and slidable in said passage, a plate protruding from the open end of said socket portion and slidable on said surface, a perforated lug depending from said plate through the opening in the upper surface and into the groove, a screw for closing the outer end of said opening, a rod mounted in said opening and extending through the perforation in said lug for guiding the movement of the slidable member, one end of said rod being connected to said screw, and the other end of said rod having a slidable connection with said body, and a coil spring surrounding said rod and having one end pressing against said lug and having its other end seated against the screw, whereby said spring is compressed and pressure exerted upon the lug for moving the movable socket.

EDWARD MORRIS JACK.

REFERENCES CITED

The following references are of record in the file of this patent:

UNITED STATES PATENTS

| Number | Name | Date |
|---|---|---|
| 704,553 | Lindstrom | July 15, 1902 |
| 747,433 | Jacobson | Dec. 22, 1903 |
| 1,056,870 | Whistler | Mar. 25, 1913 |
| 1,962,869 | Heddon | June 12, 1934 |
| 2,057,535 | McKechnie | Oct. 13, 1936 |
| 2,182,901 | Moulton | Dec. 12, 1939 |
| 2,319,377 | Wallace et al. | May 18, 1943 |